3,428,191
VEHICLE HOIST ASSEMBLY
Paul S. Newswanger, 1608 Oak Lane,
Lancaster, Pa. 17601
Filed Apr. 24, 1967, Ser. No. 633,226
U.S. Cl. 214—1        7 Claims
Int. Cl. B25j 3/00

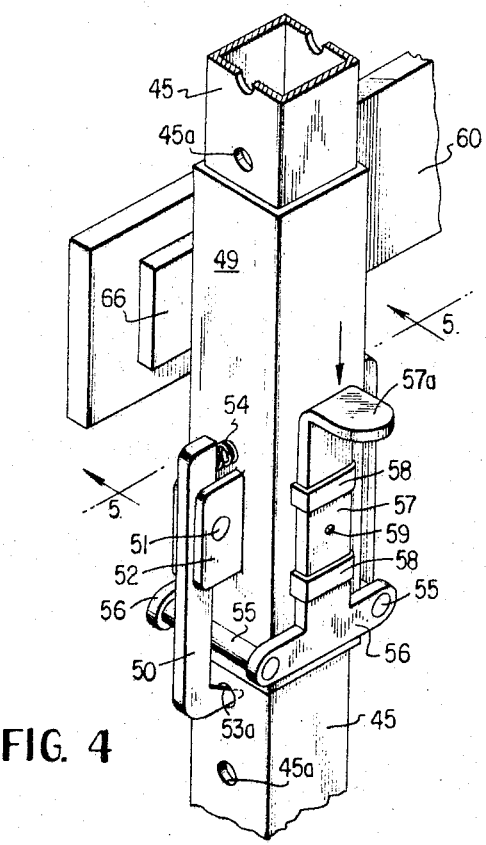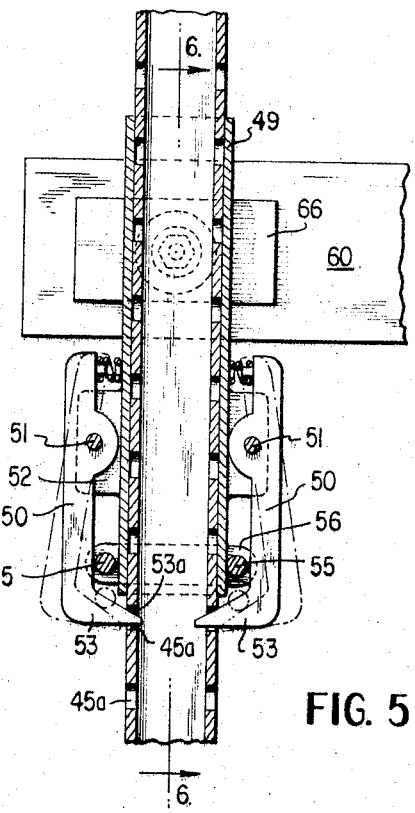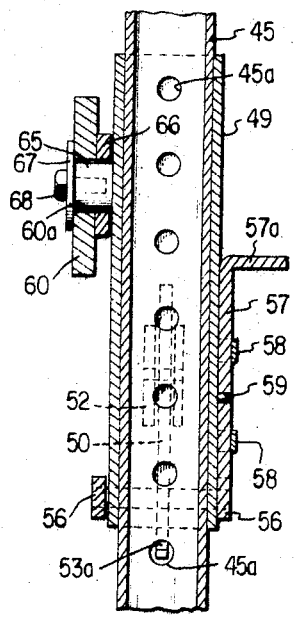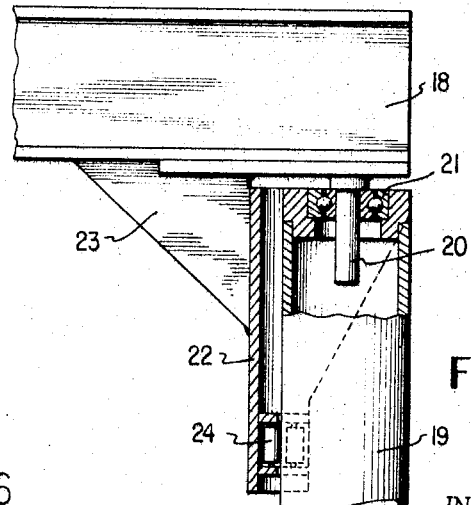
FIG. 4
FIG. 5
FIG. 6
FIG. 7
INVENTOR
PAUL S. NEWSWANGER
BY
ATTORNEY

United States Patent Office 3,428,191
Patented Feb. 18, 1969

ABSTRACT OF THE DISCLOSURE

This invention relates to a vehicle hoist assembly and more particularly to a vehicle hoist assembly adapted to lift, and to tilt the lifted vehicle about its longitudinal axis and to maintain the vehicle in its hoisted tilted position, whereby the vehicle running gear will be readily accessible to a service mechanic.

Background of the invention

Heretofore, various vehicle lifts or hoists have been proposed for lifting a vehicle and for maintaining the vehicle in the hoisted position so that a mechanic can service the vehicle running gear. The most familiar type of vehicle hoist, customarily installed in service stations, is the hydraulic type wherein the vehicle is driven onto a track assembly operatively connected to a hydraulic ram which vertically lifts the track carrying the vehicle, whereby the vehicle is lifted a sufficient height so that a mechanic may stand underneath of the vehicle while working on the running gear.

In another less sophisticated arrangement, the vehicle is lifted and supported in a horizontal plane, a few inches from the ground, by means of two pairs of jacks, one pair supporting the front of the vehicle and the other pair supporting the rear of the vehicle. In this arrangement it is necessary for the mechanic to slide underneath the vehicle and repose on his back while working on the vehicle.

While, no doubt, these hoists have been satisfactory for their intended purpose, they have been subject to certain objections. For instance, the service station-type hydraulic hoist, which requires numerous fittings, hydraulic accumulators, etc., is quite expensive to install and maintain. Furthermore, when using this type of hoist, the mechanic works in a standing or stooped position underneath the vehicle while simultaneously reaching upwardly to the running gear; thus, there is a tendency for the mechanic to become easily fatigued in a relatively short period of time. So too, in the case where the vehicle is supported on four jacks wherein it is necessary for the mechanic to be on his back underneath the vehicle; the mechanic cannot work on the vehicle for an extended period of time while in this position.

After considerable research and experimentation, the vehicle hoist assembly of the present invention has been devised to overcome the disadvantages experienced in hitherto employed hoists, and comprises, essentially, a pair of portable cranes, each including a chain hoist positioned at the front and rear of the vehicle. Each crane has a portable support assembly associated therewith for supporting the vehicle in the lifted poistion, the rear support assembly having a beam pivotally connected thereto whereby the lifted vehicle may be tilted about its longitudinal axis, the beam also including strut members for stabilizing the vehicle in the lifted, tilted position.

The front support assembly includes a bar member connected to the front crane, the end portions of the bar being adjustably connected to a pair of vertical members having latch means to maintain the bar in its adjusted position.

By this construction and arrangement, the service mechanic can be in a seated position in a direction from the side of the vehicle while working on the vehicle running gear, rather than working overhead by standing or by reposing on his back.

An object of the invention is to provide an improved vehicle hoist assembly.

Another object of the invention is to provide an improved vehicle hoist assembly adapted to lift and to tilt the lifted vehicle about its longitudinal axis, whereby access to the vehicle running gear is attained in a direction from the side of the vehicle.

Still another object of the invention is to provide an improved vehicle hoist assembly adapted to lift and to tilt the lifted vehicle about its longitudinal axis, wherein a portable crane and associated support assembly is positioned at each end of the vehicle.

Yet another object of the invention is to provide an improved support assembly for supporting a lifted vehicle in a position tilted about its longitudinal axis, wherein the support assembly includes a pivotal beam having adjustable cradle means for engaging the frame of the vehicle, and strut members connected to each end of the beam for stabilizing the vehicle in the lifted, tilted position.

Yet still another object of the invention is to provide an improved vehicle hoist assembly adapted to lift and to tilt the lifted vehicle about its longitudinal axis, wherein a portable crane and associated support assembly is positioned at each end of the vehicle, the support assembly positioned at the front of the vehicle including a bar member connected to the crane and having its end portions adjustably connected to a pair of vertical members, and latch means operatively connected between the ends of the bar member and its responsive vertical member, whereby the bar member may be maintained in its adjusted position.

A further object of the invention is to provide an improved vehicle hoist assembly adapted to lift and tilt a vehicle about its longitudinal axis, characterized by its simplicity in design, ruggedness in construction, its ease of manipulation and which is not likely to get out of order after long and continued use.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the scope of the appended claims.

In the drawings:

FIG. 4 is an enlarged, perspective view showing the slidable connection and associated latch means for adjustably connecting the bar member to the vertical member included in the support assembly positioned at the front of the vehicle;

FIG. 5 is a sectional view taken along line 5—5 of FIG. 4;

FIG. 6 is a sectional view taken along line 6—6 of FIG. 5; and

FIG. 7 is a fragmentary sectional view showing the pivotal connection between the crane hoist track and its vertical support.

Figure 1:
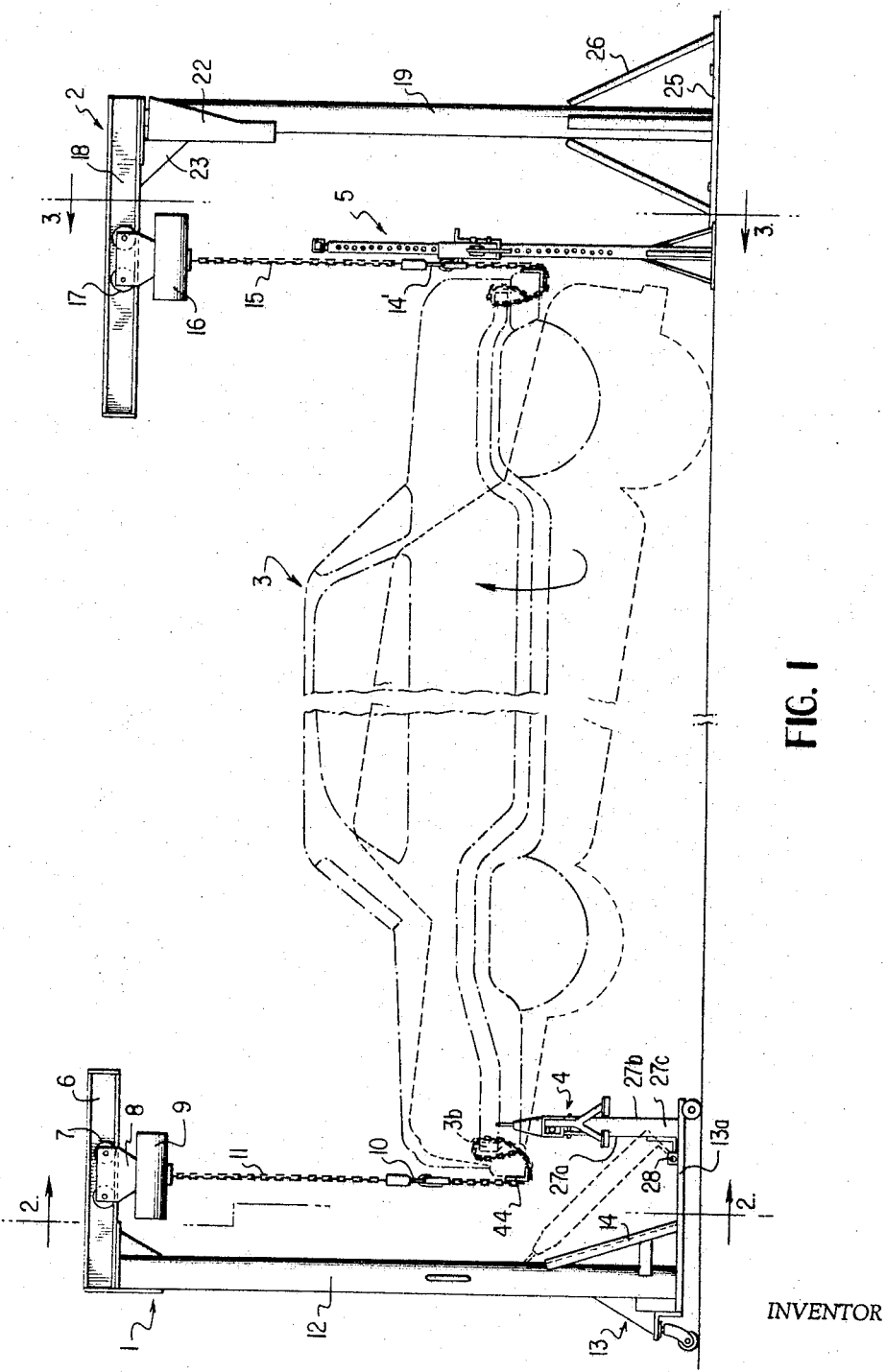
FIGURE 1 is a side elevational view of the hoist assembly of the present invention showing a vehicle, in phantom, in different stages of the lifting and tilting operation.

Referring to the drawings and more particularly to FIG. 1, the vehicle hoist assembly of the present invention comprises a pair of cranes 1 and 2, adapted to be positioned, at the rear and front, respectively, of a vehicle 3 to be lifted. Each crane has a respective support assembly 4 and 5, associated therewith, the rear support assembly being constructed and arranged to allow the vehicle to tilt about its longitudinal axis while being lifted and the front support assembly stabilizing the vehicle while in the lifted, tilted position, to be described more fully hereinafter.

Figure 2:
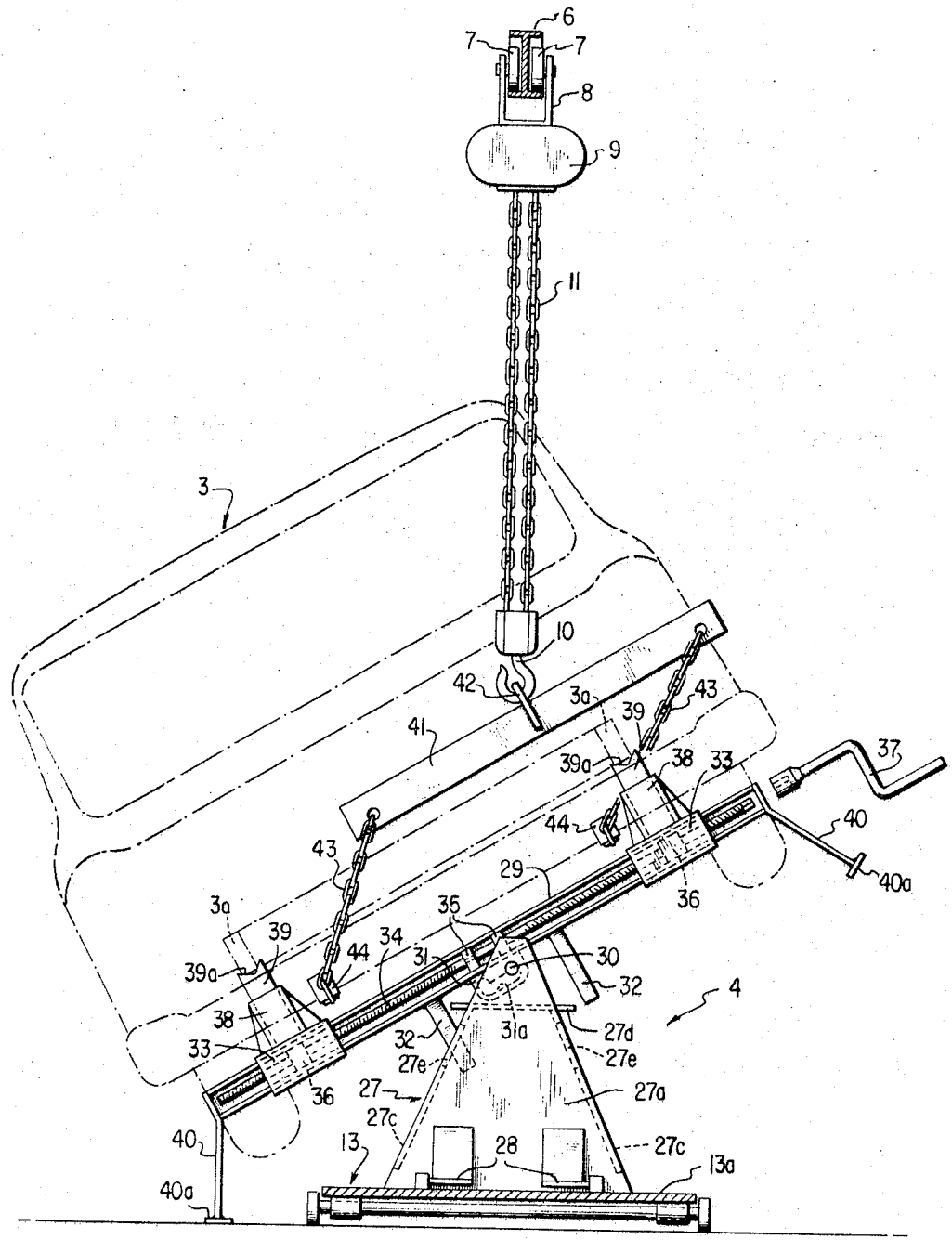
FIG. 2 is an end view taken along line 2—2 of FIG. 1, showing the crane and support assembly positioned at the rear of the vehicle supporting the vehicle in the lifted, tilted position.

As will be seen in FIGS. 1 and 2, crane 1 positioned at the rear of the vehicle comprises a longitudinally extending I-beam 6, having its flanges on each side of the web providing a track for supporting a pair of rollers 7 carried by a bracket 8 secured to an electric hoist 9. The electric hoist is of a conventional type wherein a swiveled hook 10 is carried by the lower end of a dual chain 11 having its upper end reeved on a winch driven by an electric motor. I-beam 6 is maintained in a horizontal plane, a suitable height above the vehicle to be lifted, by means of a stanchion 12 having its upper end secured to one end of the I-beam and its lower end secured to a dolly 13 having suitable braces 14 secured between the lower end portion of the stanchion and the floor 13a of the dolly.

Crane 2 positioned at the front of the vehicle is similar to the crane at the rear of the vehicle and includes a swiveled hook 14' secured to the lower end of a dual chain 15 (FIG. 3), the upper end of the chain being connected to an electric hoist 16 provided with a trolly arrangement 17 for traveling on an I-beam 18, connected to the upper end of a tubular stanchion 19. As will be seen in FIG. 7, I-beam 18 is pivotally connected to the upper end of stanchion 19 by means of a depending pintle 20 journaled with an antifriction bearing 21 secured to the upper end of the stanchion. In order to reinforce the pivotal connection a depending shroud 22 is rigidly connected to I-beam 18 by means of gusset plate 23, the shroud being spaced from the wall of the tubular stanchion and provided with roller bearings 24 which engage the stanchion wall and roll thereon when the I-beam is pivoted in a horizontal plane about the longitudinal axis of the stanchion. The lower end of the stanchion is rigidly connected to a support stand 25 including suitable braces 26.

Referring to FIG. 2, the rear support assembly 4 comprises a triangular-shaped housing 27 formed by longitudinally spaced triangular plates 27a and 27b (FIG. 1) interconnected by side plates 27c. The base of the triangular housing is pivotally secured as at 28 to the floor 13a of the dolly, whereby the housing may be pivoted from a vertical position with respect to the dolly floor to an inclined position as shown in dotted lines in FIG. 1. The triangular housing forms a pedestal for supporting a transversely extending beam 29 pivotally connected to the apical portion of the pedestal by means of a pin 30 extending between and secured to plates 27a and 27b. A depending plate 31 is secured to the medial portion of the beam and is provided with a slot 31a, channel-shaped in cross-section, through which pin 30 extends. By the construction and arrangement of pin 30 extending through the channel-shaped slot formed in plate 31, an off-center type pivotal connection is provided whereby when the beam is tilted in one direction, pin 30 is seated in one leg of the channel configured slot, and when the beam is pivoted in the opposite direction the pin is seated in the opposite leg of the channel configured slot. A horizontally disposed plate 27d is positioned beneath the pivotal connection and secured between the plates 27a, 27b and side plates 27c, to thereby provide a safety support in the event that the pin 30 should shear, whereby the beam would only drop as far as the plate 27d. A pair of depending fingers 32 are secured to the beam on each side of plate 31 and are adapted to selectively ride in slots 27e, formed in side plates 27c, to thereby stabilize the beam during its pivotal movement about pin 30 and to prevent rocking of the beam on an axis normal to the pivotal axis. Beam 29 is formed by a channel member having a pair of carriages 33 slidably mounted thereon and adapted to be moved longitudinally on the beam by a threaded stem 34 journaled within the beam by suitable bearing means 35 and extending through a nut 36 secured to each carriage. One portion of the stem is provided with a right-hand thread and another portion is provided with a left-hand thread so that when the stem is turned by means of crank 37, engaging the end of the stem, carriages 33 will slide along the beam either toward or away from each other, depending upon the direction of rotation of the crank. Each carriage is provided with a socket member 38 adapted to slidably receive a removable cradle plate 39 having a notch portion 39a formed on the upper end thereof adapted to engage the longitudinal frame member 3a of the vehicle. By the construction and arrangement of the adjustable carriages 33 carrying the cradle plates 39 inserted with the sockets 38, the carriages can be adjusted to accommodate the different widths of the longitudinal frame members in various vehicle models, and different cradle plates having suitably configurated notch portions can be selectively inserted in the sockets for use with various vehicle models. To complete the rear support assembly, a divergent strut member 40 having a foot portion 40a is secured to each end of the beam to stabilize the beam when in its tilted position, the foot portion on one strut engaging the ground when the beam is tilted 30° in one direction, and the foot portion on the other strut engaging the ground when the beam is tilted 30° in the opposite direction.

In order to lift the vehicle by the rear crane assembly for placing the vehicle on the beam and associated cradle plates, a yoke bar 41 is provided, having an eyelet 42 welded to the medial portion of the bar and engaged by the hoist hook 10. Each end of the yoke bar has a chain 43 secured thereto, the ends of each chain extending underneath the vehicle and being wrapped around and secured to the transversely extending frame member 3b (FIG. 1) of the vehicle. Suitable saddles 44 are slidably mounted on chains 43 and are adapted to engage the vehicle rear bumper in order to protect the bumper from being scratched by the chains.

Figure 3:
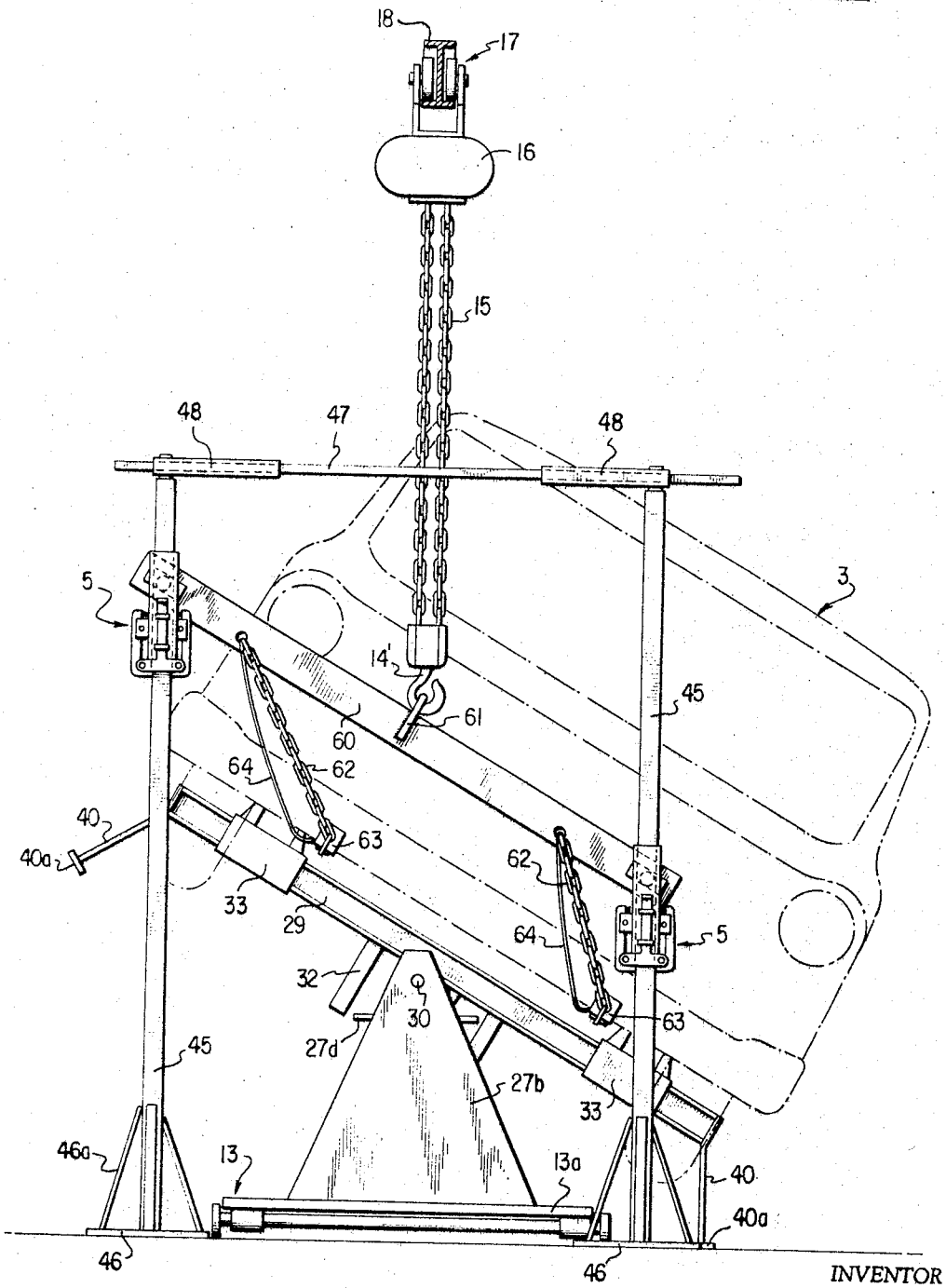
FIG. 3 is an end elevational view taken along line 3—3 of FIG. 1, showing the crane and support assembly positioned at the front of the vehicle.

Referring to FIG. 3, the support assembly 5, positioned at the front of the vehicle, comprises, a pair of spaced, parallel, vertically extending rods 45, each rod being supported at its lower end by a standard 46 including suitable braces 46a, the upper ends of the rods being interconnected by a transversely extending stabilizer bar 47 slidably mounted within transversely extending sleves 48 welded to the upper ends of the rods.

As will be seen in FIGS. 4, 5 and 6, each vertically extending rod 45 is rectangular in cross-section and has a sleeve 49 of similar cross-section slidably mounted thereon. A latch assembly is carried by each sleeve and comprises a pair of keepers 50 pivotally mounted as at 51 to a pair of brackets 52 secured to opposite walls of the sleeve. One end of each keeper extends beyond the end of the sleeve and is formed with a hook portion 53 having an inclined surface 53a, the ends of the hook portions being insertable within a selected aperture 45a formed in the walls of rod 45 whereby each sleeve 49 may be maintained in a selected, adjustable position on its respective rod 45. A spring 54 is positioned between the sleeve and the opposite end of each keeper to thereby bias the keeper hook portion into the selected apertures of the rods. Means for releasing keeper hooks 53 is provided on each sleeve and comprises a pair of cam rods 55 positioned adjacent the walls of the sleeve which carry the keepers, the corresponding ends of the cam rods being interconnected by a pair of links 56 slidably mounted on the other two walls of the sleeve. One of the links is integrally connected to an actuator formed by a vertically extending arm 57 slidably mounted within collars 58 secured to the wall of sleeve 48, the lower end of the arm being integrally connected to the link and the upper end of the arm being provided with a flange portion 57a forming a fingerhold. By the construction and arrangement of the cam rods and keeper hooks, when the actuator is pushed in a downward direction, as indicated by the arrow in FIG. 4, each cam rod 55 will engage the inclined surface 53a of the respective keeper hook to thereby urge the hooks outwardly from the rod apertures 45a, as shown in dotted lines in FIG. 5. The sleeve 49 is then free to slide on rod 45 until the actuator is pulled upwardly, thereby moving the cam rods 55 out of engagement with the inclined surface 53a of the hooks, whereby springs 54 urge the hooks into the selected apertures 45a in the rod. A spring biased ball 59 is also carried by arm 57 which is adapted to engage a spherical recess formed in the wall of sleeve 49 to thereby form a friction detent whereby the actuator is maintained in an up position to thereby maintain cam rods 55 out of engagement with the inclined surfaces 53a of the keeper hooks 53.

The front of the vehicle is lifted by means of an arrangement similar to that employed for the rear of the vehicle, and comprises a yoke bar 60 having an eyelet 61 welded to the medial portion of the bar and engaged by the hoist hook 14'. A pair of chains 62 are connected to the bar on either side of the eyelet and extend underneath the vehicle and are secured to the transversely extending frame member at the front of the vehicle, each chain also being provided with a bumper guard 63. If desired, a pair of rubber-coated cables 64 may be employed in conjunction with chains 62, as an additional safety feature, in case the chains should break when the vehicle is being lifted.

Each end of yoke bar 60 is connected to a respective sleeve 49 by means of a stud 65 (FIG. 6) carried by the sleeve, each stud extending through an aperture 60a formed in each end of the yoke bar. The bar is maintained on the stud by means of a spacer plate 66 mounted on the stud between the wall of the sleeve and the one face of the bar, the free end of the stud having a washer 67 abutting the opposite face of the yoke plate and held in place by means of a bolt 68 threaded into the stud.

When using the front support assembly, the vehicle is first lifted by the electric hoist through the yoke bar 60 connected to the vehicle through the chains 62. After the vehicle is lifted, the vertical rods 45 having the sleeves 49 located at the desired position are moved into proximity to the ends of the yoke bar so that the studs 65 may be inserted through the bar and secured in place by the washer and bolt. In some instances, the yoke bar 60 may be connected to the sleeves 49 so that the sleeves will slide on the rods 45 while the vehicle is being lifted and then latched in the desired position. In this arrangement the vertical rods 45 are adapted to be moved relative to each other to accommodate the inclination of the yoke bar in the lifted position.

In the operation of the vehicle hoist assembly of the present invention, the rear crane 1, and associated support assembly 4, is rolled underneath the rear of the vehicle to be lifted, the pedestal and assembly beam being tilted rearwardly toward the crane stanchion 12 as shown in dotted lines in FIG. 1. The rear of the vehicle is then lifted by the rear crane a sufficient height to allow the pedestal to be pivoted into an upright position underneath the vehicle, as shown in full lines in FIG. 1. After the carriages 33 and associated cradle plates 39 are adjusted to accommodate the particular frame of the vehicle being lifted, the rear crane then lowers the rear of the vehicle onto the support assembly. In this phase of the operation, the rear of the vehicle will be in the elevated position while the front of the vehicle will be supported on the ground as shown in dotted lines in FIG. 1. The front of the vehicle is then lifted by means of the front crane 2, causing the vehicle to tilt about its longitudinal axis to an angle of approximately 30° until the foot portion of strut member 40 engages the ground. The tilting of the vehicle is caused by the center of gravity of the vehicle being off-center from the pivot pin 30 and the direction to which the vehicle tilts will depend upon which leg of the channel configured slot 31a the pin is positioned. After the vehicle is lifted and tilted, the front support assembly 5 is then moved into position and connected to the front of the vehicle, as described hereinabove, in order to stabilize the vehicle in the lifted, tilted position.

What I claim as new and desire to secure by Letters Patent of the United States, is as follows:

1. A vehicle hoist assembly of the character described, comprising a first hoist means and associated support means adapted to be connected to one end of a vehicle to be lifted, a second hoist means adapted to be connected at the other end of the vehicle, said support means including a beam adapted to be connected to the frame of the vehicle, off-center pivot means connected to said beam in cooperation with said first hoist means and comprising a pedestal, pin and slot means pivotally connecting the beam to said pedestal, carriage means slidably mounted on said beam, and cradle plate means carried by said carriage means adapted to engage the frame of the vehicle, whereby the vehicle is tilted about its longitudinal axis upon actuation of said second hoist means.

2. A vehicle hoist assembly according to claim 1 wherein strut means is connected to each end of said beam for engaging the ground to thereby support the beam in its tilted position.

3. A vehicle hoist assembly of the character described, comprising a first hoist means and associated first support means adapted to be connected to one end of a vehicle to be lifted, a second hoist means adapted to be connected at the other end of the vehicle, said first support means including a beam adapted to be connected to the frame of the vehicle, off-center pivot means connected to said beam in cooperation with said first hoist means, a second support means positioned in proximity to the second hoist means, said second support means comprising a pair of spaced, parallel, vertically extending rods, sleeve means slidably mounted on each rod, latch means secured to said sleeve means adapted to engage the rod to maintain the sleeve means in a selected position on the rod, and means for operatively connecting the second hoist means to the sleeve means, whereby the vehicle is tilted about its longitudinal axis upon actuation of said second hoist means.

4. A vehicle hoist assembly according to claim 3, wherein the latch means comprises, a pair of keepers pivotally connected to said sleeve means, each keeper having a hook portion provided with an inclined surface, a plurality of longitudinally spaced apertures formed in the rod, said hook portion being adapted to be selectively inserted within a respective aperture, and cam means carried by said sleeve means adapted to engage the inclined surface of the keeper hook portion to move the keeper out of the respective aperture.

5. A vehicle hoist assembly according to claim 4, wherein actuator means is connected to the sleeve means for moving the cam means into and out of engagement with the inclined surfaces of the keeper hook portions, and friction detent means operatively connected between the sleeve means and the actuator means for releasably holding the actuator means in its inoperative position.

6. A vehicle hoist assembly according to claim 3, wherein the means for operatively connecting the second hoist means to the sleeve means comprises, a yoke bar carried by the second hoist means, an aperture formed in each end of said yoke bar, a stud secured to the sleeve means, said stud being insertable through the aperture formed in the respective end of the yoke bar and bolt means connected between said yoke bar end and its respective stud for maintaining the end of the yoke bar in the stud.

7. A vehicle hoist assembly of the character described, comprising a first hoist means and associated support means adapted to be connected to one end of a vehicle to be lifted, a second hoist means adapted to be connected at the other end of the vehicle, each hoist means comprising a vertically extending stanchion, a horizontally extending I-beam connected to the upper end of the stanchion, trolley means supported on the flanges of said I-beam, and electrical hoist means connected to said trolley means, said electrical hoist means including hook means, a yoke bar connected to said hook means, chain means connected between said yoke bar and the frame of the vehicle to be lifted, one of said I-beams pivotally connected to its respective stanchion, the pivotal connections comprising a depending pintle secured to one end of the I-beam, bearing means mounted in the upper end of said stanchion, said pintle being journaled within said bearing means, shroud means integrally connected to said I-beam and spaced from the wall of the stanchion, and bearing means connected to said shroud for engaging the outer wall of said stanchion, said support means including a beam adapted to be connected to the frame of the vehicle, off-center pivot means connected to said beam in cooperation with said first hoist means, whereby the vehicle is tilted about its longitudinal axis upon actuation of said second hoist means.

References Cited

UNITED STATES PATENTS 2,721,757  10/1955  Anderson _____ 294—81

FOREIGN PATENTS 1,070,358  12/1959  Germany.
315,981  10/1956  Switzerland.

GERALD M. FORLENZA, *Primary Examiner.*

F. E. WERNER, *Assistant Examiner.*